Sept. 30, 1958 B. A. AVERY ET AL 2,853,854
SHROUD ASSEMBLY FOR GAS TURBINE ENGINES
Filed Feb. 4, 1957

INVENTORS
B.A. AVERY, F.H. KEAST
BY: Maybee & Legris
ATTORNEYS

United States Patent Office 2,853,854
Patented Sept. 30, 1958

2,853,854

SHROUD ASSEMBLY FOR GAS TURBINE ENGINES

Burton Albert Avery, Weston, Ontario, and Francis Henry Keast, Brampton, Ontario, Canada, assignors to Orenda Engines Limited, Malton, Ontario, Canada, a corporation Application February 4, 1957, Serial No. 637,981

7 Claims. (Cl. 60—39.66)

This invention relates to gas turbine engines and in particular to gas turbine engines of the type used to propel jet aircraft.

The gas turbine engine used to power jet aircraft comprises in general a compressor stage, a combustion chamber stage, a turbine stage, an exhaust duct and a reaction nozzle. Air is admitted to the compressor stage through an air inlet which, in conventional aircraft design, has an opening directed forwardly towards the line of flight of the aircraft so as to take advantage of the ram pressure of the air entering the compressor during forward flight.

The air inlet opening in the aircraft engine housing must be of a size sufficient to pass the volume of air required to produce the high thrust necessary for take-off. This size of inlet is larger than is necessary to pass air to the engine under the ram pressure that is experienced in forward flight and, accordingly, at high Mach numbers, the air inlet receives more air than the engine can "swallow" with the result that air spills out of the air inlet and produces a drag which tends to slow the speed of the aircraft.

With aircraft designed for high speed operation, therefore, it is necessary to match the air inlet characteristics with those of the engine so that sufficient air will be fed to the engine for take-off and low speed flight while, at the same time, preventing or reducing air inlet spillage during high speed flight.

It is known in the jet aircraft industry that when the ratio of pressure in the tailpipe to ambient greatly exceeds the critical pressure ratio, which is that pressure ratio at which sonic velocity is attained in the throat of the final nozzle, then full utilization of the energy available for producing thrust requires that the flow area of the gases be first contracted then expanded. The convergent-divergent nozzle is such a device. An alternative method is to use a simple convergent nozzle but to contain the subsequent expansion of the flow within an outer shroud through which passes a secondary flow of air. The primary jet is thereby allowed to increase its velocity and momentum before being discharged from the aircraft. Some transfer of momentum to the secondary flow also occurs and this, combined with the heating of the secondary flow by the surface of the hot primary tailpipe means that part of the total thrust may be derived from the momentum of the secondary flow.

Additional gain in efficiency may be obtained if a further annulus of tertiary air is ejected around the annulus of secondary air.

Another requirement of aircraft gas turbine installations relates to the ventilation of the areas in the engine housing the fuel conduits and controls. The ventilation problem may be solved by passing air through these areas to remove any fuel vapors which might ignite. However, the ventilating air must be so ducted that it at no time comes in contact with parts of the engine which are at a temperature sufficiently high to present a danger of igniting the vapor-air mixture.

The present invention accomplishes all of these requirements and has as its principal object the provision of a shroud assembly which will prevent or reduce inlet air spillage, ventilate and cool the engine and provide for the ejection of secondary and tertiary air around the exhaust stream.

According to the invention the shroud assembly for a gas turbine engine comprises a first shroud surrounding wholly or in part the forward portion of the engine in spaced relationship thereto and defining a first space between the engine and the shroud, a second shroud surrounding the entire engine including the first shroud and defining a second space between the second shroud on the outside and the first shroud and engine on the inside, a third shroud surrounding the second shroud at the after portion of the engine and defining a third space between the third shroud and the second shroud and a duct joining the first space and the third space.

By way of illustration, one embodiment of the invention is shown in the accompanying drawings in which like reference numerals denote like parts in the various views and in which.

Gas turbine engines of the axial flow type consist generally of an air intake through which air is supplied to a compressor which delivers it to the combustion chamber. In the combustion chamber, fuel is injected into the compressed air and ignited, the products of combustion passing through the turbine which drives the compressor by a common shaft. The gases then enter the tailpipe from which they are ejected through a variable area nozzle to atmosphere to provide a propulsive thrust.

Figure 1:
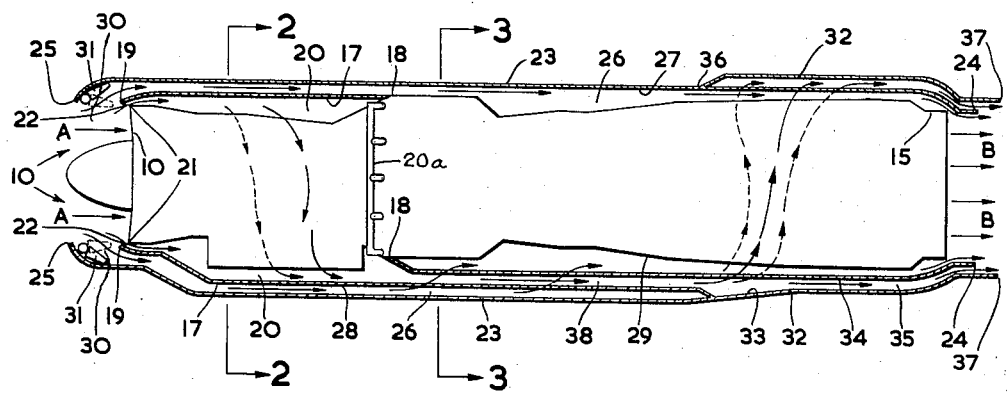
Figure 1 is a schematic view of an axial flow gas turbine engine in longitudinal cross-section showing the positions of the shrouds.

Referring now to Figure 1 in which a schematic view of an engine similar to that outlined above is shown, the air inlet 10 will be seen to receive air indicated by the arrows A which it delivers to the engine in the manner described above, the exhaust gases which provide the propulsive thrust being indicated by arrow B flowing from the extremity of the tailpipe 15.

The size of the aircraft air inlet 25 is normally decided by the requirement to pass the volume of air which the engine needs at take-off or at low flight speeds at high altitude. At supersonic flight speeds such an intake is capable of swallowing more air than the engine can handle. At such speeds a system of shock waves occurs ahead of the intake. All of the air approaching the intake passes through this shock system which inherently causes a loss of total pressure available. Because the engine cannot swallow all the air which has passed through the shock system some of this air with its depleted available energy is diverted around the intake. The loss of available energy in this spilled air results in a drag on the aircraft, which is called spillage drag. In order to reduce the volume of air spilled and therefore reduce the associated spillage drag, a bypass is provided around the engine. Referring to Figure 1, a first shroud 17 is provided which surrounds the forward portion of the engine from a rear point 18 approximately at the after end of the compressor to a forward point 19 in advance of the air inlet 10, while in the drawings the first shroud 17 is shown as completely surrounding the forward portion of the engine. The shroud 17 is impervious to air and is spaced from the engine to define between the engine and the interior surface of the shroud a first space 20. The shroud 17 is closed at its after end by securing it to the engine casing with a relatively air-tight seal. The forward end of the first shroud 17 however is open and defines, between edge 19 of the shroud and edge 21 of the engine air inlet 10, an inlet 22 for air which would normally be spilled over the edge of the aircraft inlet 25.

Surrounding the entire engine, including the first shroud 17, is a second shroud 23. This second shroud 23 extends from a rear point 24 aft of the extremity of the tailpipe 15 to a forward point 25 forwardly of the edge of the first shroud 17 and lies in spaced relationship to the engine and shroud 17 to define a substantially annular space 26 between the interior surface 27 of the shroud 23 and the external surfaces 28 and 29 of shroud 17 and the remainder of the engine respectively. This second shroud 23 is shown in the drawings as being a separate entity which is carried by the engine. However, in certain installations the inner skin of the engine nacelle could constitute this shroud.

Since the second shroud 23 extends forwardly of the forward edge 19 of the first shroud 17, an annular space 30 is provided through which some of the ram air approaching the inlet 10 may enter space 26 between the second shroud and the engine. Controllable segmented gates 31 are positioned in the annular opening 30 and are movable from a position to admit the maximum amount of air to space 26 (shown in full lines in Figure 1) to a second position admitting a minimum amount of air (shown in dotted lines in Figure 1).

A third shroud 32 is provided surrounding the second shroud 23 at the after portion thereof defining between its inner surface 33 and the outer surface 34 of the second shroud 23 a third annular space 35. The third shroud is closed along its forward edge 36 by joining it to the external surface 34 of the second shroud 23 as seen in Figure 1. The after end of the third shroud is open and the extremity 37 extends rearwardly beyond the extremity of the second shroud 23. The third shroud 32, in contrast to the structure shown in the drawings could also be provided by the inner skin of the engine nacelle in certain installations.

A duct 38 communicates between the first space 20 and the third space 35, the duct lying within the second space 26 but spaced from the outer surface 29 of the engine.

The functions of the shroud system which have been structurally described will now be explained in detail.

Ram air which rushes towards the aircraft air inlet 25 along the paths indicated by the arrows A cannot, when the aircraft is flying at high speed, enter the compressor in its entirety due to the limited swallowing capacity of the compressor. In order to prevent all of this excess air from spilling over the edges of the inlet cowl, the two shrouds have been extended forwardly of the plane of the air inlet, the second shroud 23 extending farther forwardly than does the first shroud 17.

Excess air, will, in part therefore, enter the inlet 22 between the forward edges of the shroud 17 and the compressor air inlet 10 and pass into the first space 20. The space 20 houses a part at least of the fuel lines and controls such as are shown schematically at 20a in Figure 1 and, in general, is an area which it is desired to ventilate by cool air to obviate the possibility of ignition of the fuel-air mixture which may be present in this space. A further portion of the excess ram air will enter the substantially annular space 26 between the second shroud 23 and the first shroud 17 and the engine through the controllable segmented gates 31. This air will pass over the surface of shroud 17 and over the skin of the combustion chambers and the turbine and tailpipe where it will cool these portions of the engine and acquire heat energy in the process. Passing axially rearwardly of the engine the air in space 26 will finally be ejected as an annulus of heated secondary air around the jet exhaust stream where it will augment the thrust of the engine by serving to confine the exhaust stream indicated by the arrows B after it has left the defining walls of the tailpipe.

The air which has entered the space 20 is led through a duct 38 which may also house a portion of the fuel system of the aircraft into the annular space 35 within the third shroud 32 surrounding the after portion of the second shroud 23, carrying with it any fuel vapors which may be present in annular space 20. Duct 38 is spaced from the skin of the combustion chamber and the turbine so that the vapor-air mixture in the duct will not contact any of the hot parts of the engine.

The third shroud 32 serves to form the air from duct 37 into an annulus around the second shroud 23 so that it may be ejected as an annulus of tertiary air about the annulus of heated secondary air delivered from space 26 between the second shroud and the engine tailpipe to further augment the thrust of the engine by further assisting in confining the exhaust stream shown by the arrows B.

In order to assist the annuli of secondary and tertiary air in their task of confining the exhaust stream, the shrouds 23 and 32 extend further rearwardly than does the tailpipe 15, shroud 32 extending further than does shroud 23.

Figure 2:
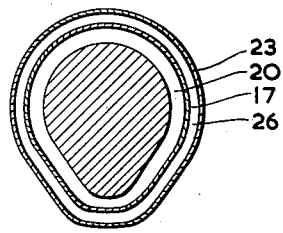
Figure 2 is a section taken along line 2—2 of Figure 1.
Figure 3:
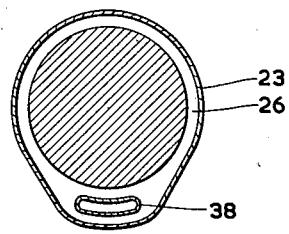
Figure 3 is a section taken along line 3—3 of Figure 1.

From a consideration of Figures 1 to 3 of the drawings it will immediately be apparent that the function of the enveloping members which have been described as shrouds in the foregoing specification can be performed by certain portions of the engine nacelle in cases where it is not convenient to fit the engine with a separate shroud member. For example the second shroud 23 could conveniently be the inner casing of the engine nacelle and the third shroud 32 could quite conveniently be the after end of this inner nacelle skin. For the purpose of convenience in description, however, the invention has been described as if the engine were fitted with shroud members which are quite separate from the nacelle structure in which the engine will ultimately be mounted.

From the above description of the invention it will be appreciated that a shroud system for gas turbine engines has been devised which embodies all the desirable features outlined in the introductory portion of this specification. The embodiment shown in the drawings is intended to be illustrative only of the invention and not limiting in any way. It will be evident that modifications in structure may be made in the embodiment shown without departing from the spirit of the invention or the scope of the appended claims.

What we claim as our invention is:

1. A shroud assembly for a gas turbine engine having an air inlet and an exhaust duct, a first shroud surrounding at least a part of the forward portion of the engine in spaced relationship thereto and defining a first space between the engine and the shroud, the first space being open at the forward end and closed at the rearward end, a second shroud surrounding the entire engine including the first shroud and defining a second space between the second shroud on the outside and the first shroud and engine on the inside, the second space being open at both ends, a third shroud surrounding the second shroud at the after portion of the engine and defining a third space between the third shroud and the second shroud, the third shroud being closed at its forward end and open at its rearward end, and a duct joining the first space with the third space.

2. A shroud assembly for a gas turbine engine having an air inlet and an exhaust duct, a first shroud extending forwardly of the plane of the air inlet and surrounding at least a part of the forward portion of the engine in spaced relationship thereto and defining a first space between the engine and the shroud, the first space being open at the forward end and closed at the rearward end, a second shroud surrounding the entire engine including the first shroud and defining a second space between the second shroud on the outside and the first shroud and the engine on the inside, the second space being open at both ends, a third shroud surrounding the second shroud at the after portion of the engine and defining a third space between the third shroud and the second shroud, the third shroud being closed at its forward end and open at its rearward end, and a duct joining the first space with the third space.

3. A shroud assembly for a gas turbine engine having an air inlet and an exhaust duct, comprising a first shroud extending forwardly of the plane of the air inlet and surrounding at least a part of the forward portion of the engine in spaced relationship thereto and defining a first space between the engine and the shroud, the first space being open at its forward end and closed at its rearward end, a second shroud extending forwardly of the first shroud and surrounding the entire engine including the first shroud and defining a second space between the second shroud on the outside and the first shroud and the engine on the inside, the second space being open at both ends, a third shroud surrounding the second shroud at the after portion of the engine and defining a third space between the third shroud and the second shroud, the third shroud being closed at its forward end and open at its rearward end, and a duct joining the first space with the third space.

4. A shroud assembly for a gas turbine engine having an air inlet and an exhaust duct, comprising a first shroud extending forwardly of the plane of the air inlet and surrounding at least a part of the forward portion of the engine in spaced relationship thereto to define a first space between the engine and the shroud, the first space being open at its forward end and closed at its rearward end, a second shroud extending forwardly of the first shroud and rearwardly of the exhaust duct and surrounding the entire engine including the first shroud and defining a second space between the second shroud on the outside and the first shroud and the engine on the inside, the second space being open at both ends, a third shroud surrounding the second shroud at the after portion of the engine and defining a third space between the third shroud and the second shroud, the third shroud being closed at its forward end and open at its rearward end and a duct joining the first space with the third space.

5. A shroud assembly for a gas turbine engine having an air inlet and an exhaust duct, a first shroud extending forwardly of the plane of the air inlet and surrounding the forward portion of the engine in spaced relationship thereto to define a first annular space between the engine and the shroud, the first annular space being open at its forward end and closed at its rearward end, a second shroud extending forwardly of the first shroud and rearwardly of the exhaust duct and surrounding the entire engine including the first shroud to define a second annular space between the second shroud on the outside and the first shroud and the engine on the inside, the second annular space being open at both its ends, a third shroud surrounding the after portion of the second shroud and extending rearwardly thereof to define a third annular space between the third shroud and the second shroud, the third annular space being closed at its forward end and open at its rearward end and a duct joining the first annular space with the third annular space.

6. A shroud assembly for a gas turbine engine having an air inlet and an exhaust duct, a first shroud extending forwardly of the plane of the air inlet and surrounding the forward portion of the engine in spaced relationship thereto to define a first annular space between the engine and the shroud to receive excess air entering the air inlet, the first annular space being open at its forward end and closed at its rearward end, a second shroud extending forwardly of the first shroud and rearwardly of the exhaust duct and surrounding the entire engine including the first shroud to define a second annular space between the second shroud on the outside and the first shroud and the engine on the inside to receive excess air entering the air inlet, means in the second annular space to control air entry thereto, the second annular space being open at both ends, a third shroud surrounding the after portion of the second shroud and extending rearwardly thereof to define a third annular space between the third shroud and the second shroud, the third shroud being closed at its forward end and open at its rearward end, and a duct joining the first annular space with the third annular space.

7. A shroud assembly for a gas turbine engine as claimed in claim 6 in which the means in the second annular space to control air entry thereto include a series of controllable segmented gates movable from a first position substantially parallel to the direction of air flow to a second position substantially normal thereto.

References Cited in the file of this patent

UNITED STATES PATENTS

| 2,612,748 | Tenney et al. | Oct. 7, 1952 |
| 2,663,517 | Price | Dec. 22, 1953 |